(12) United States Patent  (10) Patent No.: US 7,193,349 B2
Laurandel et al.  (45) Date of Patent: Mar. 20, 2007

(54) BRUSH HOLDER FOR A CARBON BRUSH

(75) Inventors: Hervé Laurandel, Herouville Saint Clair (FR); Philippe Raoul, Fresne la Mere (FR)

(73) Assignee: Meritor Light Vehicle Systems - France, Sully-sur-Loire (FR)

( * ) Notice: Subject to any disclaimer, the term of this patent is extended or adjusted under 35 U.S.C. 154(b) by 0 days.

(21) Appl. No.: 10/297,335

(22) PCT Filed: May 29, 2001

(86) PCT No.: PCT/FR01/01670

§ 371 (c)(1),
(2), (4) Date: Dec. 4, 2002

(87) PCT Pub. No.: WO01/95439

PCT Pub. Date: Dec. 13, 2001

(65) Prior Publication Data

US 2004/0017126 A1    Jan. 29, 2004

(30) Foreign Application Priority Data

Jun. 8, 2000   (FR) .................................. 00 07365

(51) Int. Cl.
    H02K 13/00    (2006.01)

(52) U.S. Cl. ...................... 310/242; 310/238; 310/248; 310/239; 310/245

(58) Field of Classification Search ................ 310/238, 310/239, 248, 242, 245
See application file for complete search history.

(56) References Cited

U.S. PATENT DOCUMENTS 2,822,487 A * 2/1958 Barel .......................... 310/239

(Continued)

FOREIGN PATENT DOCUMENTS

DE    3627491 A1 * 2/1988

(Continued)

OTHER PUBLICATIONS

Information provided is from Manufacturing Processes Reference Guide by Robert H. Todd, Dell K. Allen, and Leo Alting.—1st ed. Published by Industrial Press Inc., 1994.*

(Continued)

Primary Examiner—Darren Schuberg
Assistant Examiner—Yahveh Comas
(74) Attorney, Agent, or Firm—Carlson, Gaskey & Olds

(57) ABSTRACT

An electric motor, in particular a motor and gear box unit for activating functional equipment in a vehicle, includes a rotor shaft carrying a commutator co-operating with conductive brushes disposed in brush supports fixed to a printed circuit card; the motor is provided with means for enabling brush supports to be fixed to the printed circuit card solely by surface mounting. These means may comprise, for each brush, a metal casing containing the brush and having one wall with at least one transverse tab adapted to pass through the printed circuit card in order to position and hold the casing on the card and in order to provide an electrical connection. The invention enables brush-support devices to be fixed to the printed circuit card solely by surface mounting, thus making it pointless to perform an additional flow soldering operation as is required in the prior art.

8 Claims, 3 Drawing Sheets

U.S. PATENT DOCUMENTS

| | | | |
|---|---|---|---|
| 3,087,081 A * | 4/1963 | Apostoleris | 310/239 |
| 3,482,135 A * | 12/1969 | Hurlin | 310/239 |
| 3,584,248 A * | 6/1971 | Higashino et al. | 310/239 |
| 3,710,160 A * | 1/1973 | Voglesonger | 310/247 |
| 3,924,147 A * | 12/1975 | Tarnow et al. | 310/239 |
| 4,074,162 A * | 2/1978 | Parzych | 310/245 |
| 4,404,488 A | 9/1983 | Herr | |
| 4,596,941 A * | 6/1986 | Kluck | 310/239 |
| 4,774,430 A * | 9/1988 | Rodriguez et al. | 310/239 |
| 4,851,730 A * | 7/1989 | Fushiya et al. | 310/239 |
| 5,034,640 A * | 7/1991 | Shimizu | 310/71 |
| 5,196,750 A * | 3/1993 | Strobl | 310/239 |
| 5,319,277 A * | 6/1994 | Materne et al. | 310/239 |
| 5,397,952 A * | 3/1995 | Decker et al. | 310/242 |
| 5,780,952 A * | 7/1998 | Lau | 310/239 |
| 5,949,173 A * | 9/1999 | Wille et al. | 310/220 |
| 6,271,615 B1 * | 8/2001 | Morimoto et al. | 310/239 |
| 6,465,920 B2 * | 10/2002 | Harita et al. | 310/71 |
| 6,603,235 B1 * | 8/2003 | Kimura | 310/239 |
| 6,680,556 B2 * | 1/2004 | Menz et al. | 310/239 |
| 6,822,367 B1 * | 11/2004 | Uchida et al. | 310/242 |

FOREIGN PATENT DOCUMENTS

| | | |
|---|---|---|
| DE | 3726689 A1 * | 4/1988 |
| DE | 42 15 446 | 11/1992 |
| EP | 874424 A2 * | 10/1998 |
| FR | 2582872 | 12/1986 |
| FR | 2582872 A * | 12/1986 |
| FR | 2582872 A1 * | 12/1986 |
| FR | 2763753 | 11/1998 |
| GB | 2214358 A * | 8/1989 |
| JP | 57-75549 | 5/1982 |
| JP | 61-273147 | 12/1986 |
| JP | 06315251 A * | 11/1994 |
| JP | 10-108402 | 4/1998 |
| JP | 10108402 A * | 4/1998 |
| JP | 10108403 A * | 4/1998 |

OTHER PUBLICATIONS http://www.lescon.biz/pth.html.*

* cited by examiner

BRUSH HOLDER FOR A CARBON BRUSH

This application claims priority to international application PCT/FR01/01670 filed on May 29, 2001, which claims priority to French patent application 00 07365 filed on Jun. 8, 2000.

BACKGROUND OF THE INVENTION

The present invention relates to a motor and gear box unit, in particular a unit for driving functional equipment in a vehicle, e.g. for closing a window, moving a seat, opening a roof, . . . .

The electric motor includes a rotor shaft provided with a commutator that co-operates with conductive brushes disposed in brush supports fixed to a printed circuit card for feeding electricity. The support device for each brush is relatively complex and in a known embodiment comprises a metal cage with a spring for holding the brush pressed against the commutator. The components of the metal cages constituting the brush supports pass through the printed circuit card in order to be fixed thereto, and they are secured to the card by a flow soldering operation performed over a bath of liquid metal.

SUMMARY OF THE INVENTION

An object of the invention is to simplify the mounting and assembly of brush supports on the printed circuit card in order to eliminate the additional flow soldering operation and to provide a corresponding decrease in the cost of manufacturing the motor.

In accordance with the invention, the electric motor is provided with means enabling brush supports to be fixed to the printed circuit card solely by surface mounting.

Such surface fixing avoids any need to pass the metal cages for supporting brushes through the card, thus making it pointless to perform an additional soldering operation on the opposite face of the card.

In an embodiment of the invention, said means comprise, for each brush, a metal casing containing the brush and having a wall that is contiguous with the printed circuit card with at least one transverse tab adapted to pass through the printed circuit card so as to position and hold said casing on said card and so as to provide a good electrical connection.

In an advantageous embodiment, two transverse positioning tabs are provided in this way: these tabs serve not only to hold the brush support on the printed circuit card, but also to conduct electricity, and in addition they withstand the force exerted on the brush by the commutator.

The tab(s) may be mounted by force in the card, may be coated in a solder paste, and may be processed in an oven in conventional manner.

In a variant, it is also possible to mount the tab by force in a plated through hole of the card, so as to provide an electrical connection.

BRIEF DESCRIPTION OF THE DRAWINGS

Other features and advantages of the invention appear from the following description made with reference to the accompanying drawings which show various embodiments as non-limiting examples.

DETAILED DESCRIPTION OF THE PREFERRED EMBODIMENT

Figure 1:
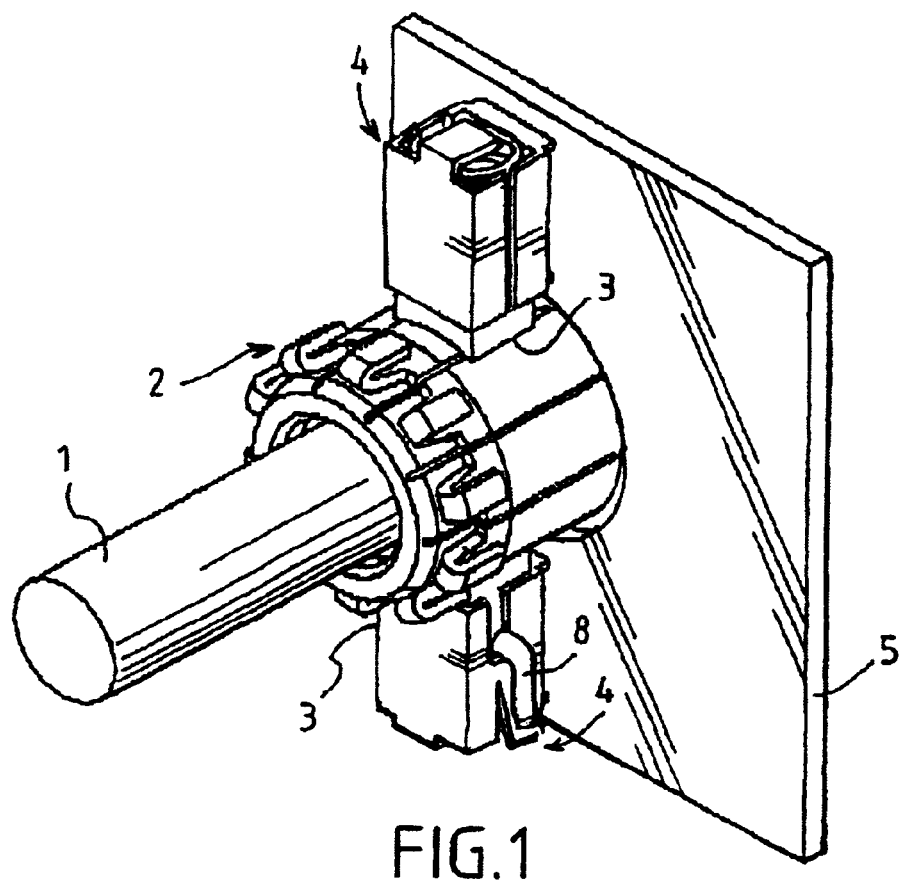
FIG. 1 is a substantially lifesize fragmentary perspective view of an electric motor of the invention, showing a first embodiment of its device for mounting supports for brushes placed so as to bear against a coaxial commutator on the shaft of the rotor.
Figure 2:
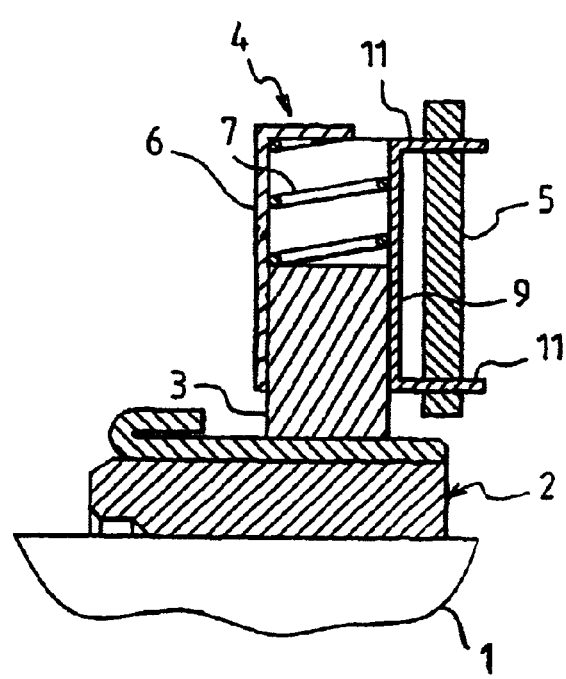
FIG. 2 is an axial longitudinal section view through one of the FIG. 1 brush-support devices, on a larger scale.

The electric motor shown in part in FIGS. 1 and 2 can be constituted in particular by a motor and gear box unit for driving functional equipment in a vehicle. It has a shaft 1 of a rotor (not shown), the shaft carrying a commutator 2 which co-operates with two diametrically opposite conductive brushes placed in brush supports 4 that are fixed to a printed circuit card 5 extending perpendicularly to the longitudinal axis of the rotor.

The other elements constituting the electric motor are well known in themselves and are therefore not shown.

This electric motor is fitted with means enabling supports 4 for the brushes 3 to be fixed to the printed circuit card 5 solely by surface mounting, without the support proper passing through the card. In the embodiment shown, these means comprise, for each brush 3, a metal casing 6 forming a cage and containing the corresponding brush 3 together with a spring 7 for applying thrust to the brush 3 so as to keep it pressed conductively against the commutator 2.

The spring 7 may be helical as shown, and it bears against the end wall of the casing 6. The brush 3 has a conductive metal braid 8 fixed thereto. A wall 9 of the casing 6 which is contiguous with the printed circuit card 5 has at least one transverse tab 11 adapted to pass through the card 5 so as to position and hold the casing 6 thereon, and so as to provide an electrical connection. In the embodiment shown in FIG. 2, the wall 9 that is parallel to the card 5 is thus fitted with two end tabs 11, e.g. made by stamping, and serving to ensure that the support 4 is properly positioned and also to provide electrical conduction. In addition, the tabs 11 serve to withstand the force developed by the pressure of the brush 3 against the commutator 2.

Figure 3:
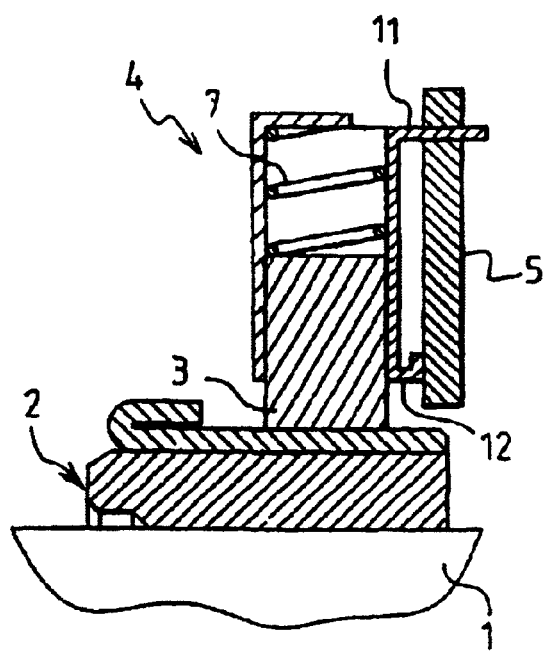
FIG. 3 is a view analogous to FIG. 2 showing a variant embodiment of the brush-holder device.

In the variant embodiment shown in FIG. 3, the device for supporting the brush 3 has only one positioning and electrical conduction tab 11 that passes through the card 5. The second tab 11 is replaced by a folded tab 12 that bears against the surface of the printed circuit card 5 without passing through it. This tab 12 is used for conducting electricity after it has been soldered to the printed circuit card 5 on being passed through an oven, and also for enabling the support 4 to press against the card 5. As shown in FIG. 3, the tab 12 is located entirely on one side of a plane defined by the printed circuit card 5.

In both of the embodiments of FIGS. 2 and 3, the tabs 11 can be fixed to the printed circuit card 5 in two different ways:

a) either they are forced through the card 5 and then coated in solder paste and treated in an oven in conventional manner;

b) or else the tabs 11 are forced into respective plated-through holes of the printed circuit card 5 so as to provide an electrical connection.

Figure 4:
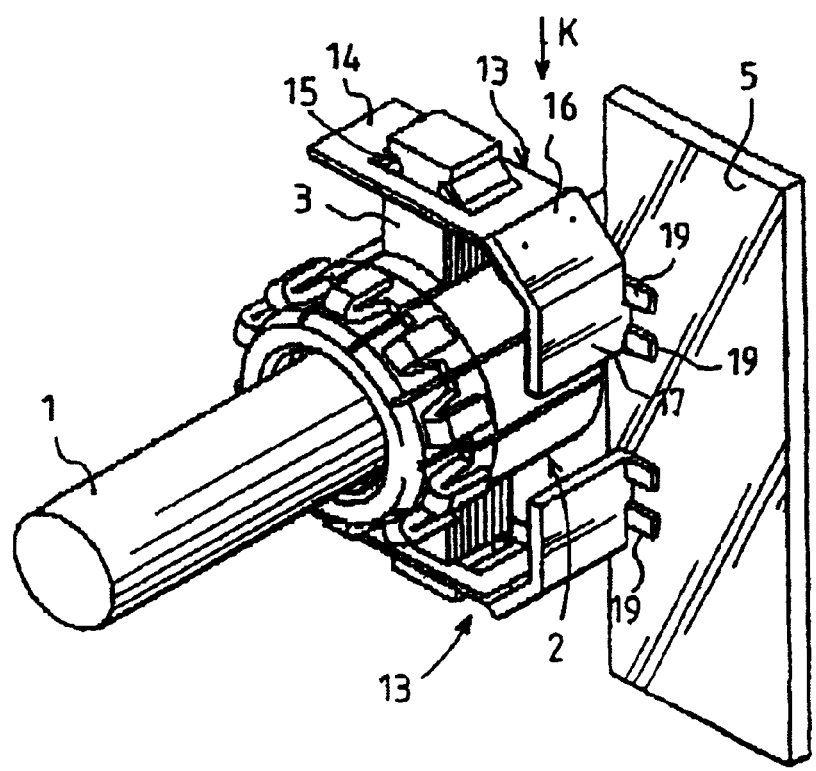
FIG. 4 is a fragmentary perspective view analogous to FIG. 1 showing a second embodiment of the electric motor of the invention.
Figure 5:
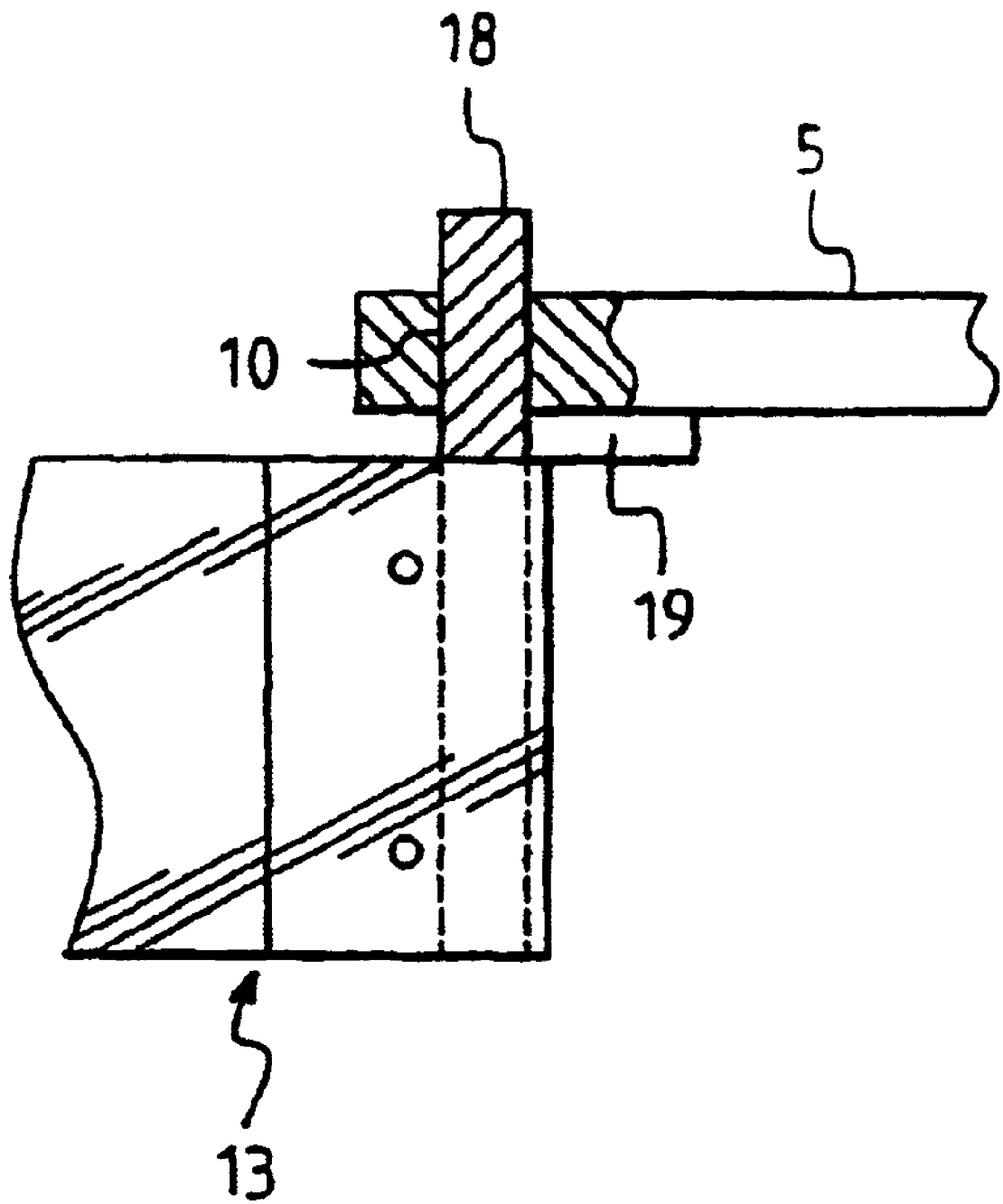
FIG. 5 is a fragmentary plan view seen looking along arrow K in FIG. 4 and on a larger scale.

In the second embodiment of the electric motor shown in FIGS. 4 and 5, the means for fixing each brush 3 to the printed circuit card 5 comprise a support constituted by a resilient arm 13 fixed firstly to the card 5 and secondly to the brush 3. This support arm 13 is constituted in the example shown by a first rectangular segment 14 pierced with an opening 15 enabling the segment or plate 14 to be snapped onto a suitably shaped end of the brush 3, a second segment 16 that is inclined relative to the first segment 14, and a third segment 17 that is also inclined, at an obtuse angle, relative to the second segment 16. The set of three segments 14, 16, 17 surrounds part of the commutator 2. Two arms 13 are thus disposed symmetrically on opposite sides of the commutator 2.

Each arm 13 carries a positioning tab 18 that is forced through a hole 10 in the printed circuit card 5, together with at least one electrically conductive finger 19 fixed to face the printed circuit card 5. In the example shown, the device thus has two conductive fingers 19 for each arm 13, which fingers are fixed by a solder paste and after being passed through an oven in conventional manner.

The tab 18 ensures that the brush-carrier arm 13 is properly positioned relative to the card 5 and withstands the force developed by the brush 3 pressing against the commutator 2.

In a possible variant, the hole 10 is plated-through so as to enable electricity to be conducted by the tab 18. In this variant, the conductive fingers 19 can therefore be omitted.

The force developed by pushing the brushes 3 against the commutator 2, which force must be withstood by the brush-support device, is of the order of a few newtons.

Other conventional techniques for soldering surface-mounted components may be used.

In the various possible embodiments of the invention, the elements constituting supports for the brushes 3 do not pass through the printed circuit card 5, only one or more positioning and electricity conductivity tabs pass through it. As a result, the additional operation of flow soldering that is required in the prior art is eliminated, thereby simplifying mounting of brush supports and reducing overall manufacturing cost.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An electric motor for activating functional equipment in a vehicle comprising:
   a rotor shaft carrying a commutator co-operating with at least two conductive brushes;
   a printed circuit card that defines a plane; and
   at least two brush supports that each house one of the at least two conductive brushes and are fixed to the printed circuit card, wherein each of the at least two brush supports forms a casing containing one of the at least two conductive brushes,
   wherein one wall of each of the casings is contiguous with the printed circuit card,
   wherein the one wall of each of the casings has at least one first tab that bears against the printed circuit card without passing through the printed circuit card, and the at least one first tab is located entirely on one side of the plane defined by the printed circuit card, and
   wherein the one wall of each of the casings has a second tab that is transverse to the at least one first tab and that passes through the printed circuit card to position and hold the casings on the printed circuit card.

2. The electric motor as recited in claim 1, further including a resilient member that biases each of the at least two conductive brushes in contact with the commutator.

3. The electric motor as recited in claim 1, wherein the at least one first tab provides an electrical connection.

4. The electric motor as recited in claim 1, wherein the at least one first tabs mounted on the printed circuit card, coated in a solder paste, and treated in an oven.

5. The electric motor as recited in claim 1, wherein the printed circuit card includes a plated-through hole, and the second tab is mounted by force in the plated-through hole of the printed circuit card to provide an electrical connection.

6. The electric motor as recited in claim 1, wherein each of the casings is metal.

7. The electric motor as recited in claim 1, wherein the printed circuit card includes an opening, and the second tab is mounted by force into the opening in the printed circuit card.

8. The electric motor as recited in claim 1, wherein the one wall of each of the casings is substantially parallel to the printed circuit card.

* * * * *

UNITED STATES PATENT AND TRADEMARK OFFICE
CERTIFICATE OF CORRECTION

| | | |
|---|---|---|
| PATENT NO. | : 7,193,349 B2 | |
| APPLICATION NO. | : 10/297335 | |
| DATED | : March 30, 2007 | |
| INVENTOR(S) | : Laurandel et al. | |

It is certified that error appears in the above-identified patent and that said Letters Patent is hereby corrected as shown below:

Claim 4, Column, 4, line 33: Delete "tabs" and insert --tab is--

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,193,349 B2 | Page 1 of 1 |
| APPLICATION NO. | : 10/297335 | |
| DATED | : March 20, 2007 | |
| INVENTOR(S) | : Laurandel et al. | |

It is certified that error appears in the above-identified patent and that said Letters Patent is hereby corrected as shown below:

Claim 4, Column, 4, line 33: Delete "tabs" and insert --tab is--

This certificate supersedes Certificate of Correction issued May 29, 2007.

Signed and Sealed this

Nineteenth Day of June, 2007

JON W. DUDAS
*Director of the United States Patent and Trademark Office*